United States Patent
Godbole et al.

(10) Patent No.: US 8,793,358 B1
(45) Date of Patent: Jul. 29, 2014

(54) FLEXIBLE PACKET PROCESSING FOR NETWORK DEVICES

(75) Inventors: Avanindra Godbole, San Jose, CA (US); Jean-Marc Frailong, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 123 days.

(21) Appl. No.: 13/112,933

(22) Filed: May 20, 2011

Related U.S. Application Data

(60) Provisional application No. 61/479,730, filed on Apr. 27, 2011.

(51) Int. Cl.
  *G06F 15/173* (2006.01)
(52) U.S. Cl.
  USPC .......................................................... 709/223
(58) Field of Classification Search
  CPC .......... H04L 49/90; H04L 47/52; H04L 47/60
  USPC ................... 370/395, 429; 712/218; 709/223
  See application file for complete search history.

(56) References Cited

U.S. PATENT DOCUMENTS

| | | | | |
|---|---|---|---|---|
| 6,915,521 B1 * | 7/2005 | Monteiro | ...................... | 719/316 |
| 7,215,637 B1 | 5/2007 | Ferguson et al. | | |
| 7,466,703 B1 * | 12/2008 | Arunachalam et al. | ........ | 370/392 |
| 7,558,270 B1 * | 7/2009 | Wilford et al. | ........... | 370/395.42 |
| 2002/0057708 A1 * | 5/2002 | Galbi et al. | ..................... | 370/429 |
| 2002/0120828 A1 * | 8/2002 | Modelski et al. | ............. | 712/200 |
| 2003/0179742 A1 * | 9/2003 | Ogier et al. | ..................... | 370/351 |
| 2006/0114914 A1 * | 6/2006 | Anand et al. | ............. | 370/395.53 |
| 2007/0237146 A1 * | 10/2007 | Hadzic et al. | .................. | 370/392 |
| 2008/0126553 A1 * | 5/2008 | Boucher et al. | ................ | 709/230 |
| 2009/0271592 A1 * | 10/2009 | Jensen | .......................... | 712/214 |
| 2009/0288136 A1 * | 11/2009 | Chang et al. | ....................... | 726/1 |
| 2009/0300350 A1 * | 12/2009 | Gai et al. | ........................ | 713/160 |
| 2010/0071055 A1 * | 3/2010 | Kaniz et al. | ...................... | 726/14 |
| 2011/0064084 A1 * | 3/2011 | Tatar et al. | ...................... | 370/392 |
| 2011/0317722 A1 * | 12/2011 | Gaddam et al. | ................ | 370/474 |
| 2012/0137090 A1 * | 5/2012 | Biswas et al. | .................. | 711/157 |
| 2012/0246449 A1 * | 9/2012 | Assarpour et al. | ............ | 712/216 |
| 2013/0070588 A1 * | 3/2013 | Steele et al. | ................... | 370/230 |

\* cited by examiner

*Primary Examiner* — Asad Nawaz
*Assistant Examiner* — Syed S Ali
(74) *Attorney, Agent, or Firm* — Shumaker & Sieffert, P.A.

(57) ABSTRACT

In general, techniques are described for flexible packet processing. A network device for processing a data packet comprise a packet processing engine and a special handling unit external from the packet processing engine. The packet processing engine includes one or more of a plurality of pipelined packet processing units that, when processing the data packet, generate one or more events and determine whether to associate a trap and/or a sampling class with the data packet based on the generated events. The pipelined packet processing units then set bits of a vector that is passed between the pipelined packet processing units to associate the packet with the determined trap and/or sampling class, and processes the packet based on the set one or more bits of the vector.

37 Claims, 7 Drawing Sheets

FLEXIBLE PACKET PROCESSING FOR NETWORK DEVICES

This application claims the benefit of U.S. Provisional Application 61/479,730 filed on Apr. 27, 2011, which is incorporated herein by reference.

TECHNICAL FIELD

The invention relates to network devices and, more particularly, processing packets with network devices.

BACKGROUND

Network devices generally process data in the form of data packets. When interconnected, network devices may receive data packets from source devices, such as personal computers, laptop computers, slate or tablet computers, cellular phones (including so-called "smart phones"), servers, or any other type of device capable of communicating data packets via a network of interconnected network devices. Certain types of network devices, referred to as routers, may route or otherwise forward these data packets received from the source devices through the network to a destination device identified by a destination address within a header of each of the data packets. The destination device may comprise personal computers, laptop computers, slate or tablet computers, cellular phones (including so-called "smart phones"), servers, or any other type of device capable of receiving data packets via a network of interconnected network devices.

In early networks, routers merely routed the data packets between one another without performing much in the way of additional services. The routers processed the data packet to identify the destination address to which this data packet was to be sent. Upon identifying the destination address, the routers then identified a port or interface over which to forward the data packet to its intended destination based on the destination address.

As networks developed over time, routers were developed that featured more sophisticated forms of packet processing. For example, current routers may now perform any number of checks to determine packet validity and/or integrity. Moreover, current routers may also extract data from packet headers to determine such things as a layer two (which is also known as a "data link layer") media access control (MAC) address, an layer 3 (which is also known as a "network layer") Internet protocol (IP) address, or any other information with regard to the various layers of the Open System Interconnection (OSI) model. These routers may also, in some instances, alter various aspects of the header data of the packets to replace or otherwise change certain aspects of the packet, such as a layer two domain, to provide for certain functionality required by certain services or protocols.

SUMMARY

The techniques described herein are directed to packet processing using functional blocks that form a pipelined packet processing engine or structure. Each functional block of this pipelined packet processing engine may issue traps when processing the data packets, where these traps may indicate that the packet requires special processing in contrast to normal packet processing. Moreover, each functional block may identify the data packets as a candidate for sampling, where the term sampling refers to making copies of the original data packets for packet processing capabilities, such as packet snooping, data collection and packet mirroring, which typically require the network device to copy the packet to form a duplicate packet.

The techniques may provide a more flexible form of packet processing that facilitates administrative control over the treatment of traps and the interaction between traps and sampling aspects of routers. Rather than attempt to resolve traps and sampling requirements for each data packet at each functional block along the pipelined packet processing engine, the techniques may provide for a packet processing pipeline that delays decisions with regard to traps and sampling until the end of the pipeline, when all of the various functional blocks within the pipeline have had an opportunity to set traps for and configure sampling of the data packet. By delaying these decisions until packet processing for this data packet (or a portion thereof, such as ingress packet processing or egress packet processing) is complete, the techniques may enable flexible treatment with regard to the various set traps and sampling classes (which denote how sampling is to occur and where the sampled packets are to be sent). The techniques may also expose a user interface by which a user may define what operations to take with regard to certain traps (such as ignore the trap), how traps impact sampling, and how different sampling classes behave with respect to one another. In this respect, the techniques may provide for a form of flexibly packet processing that promotes data collection, troubleshooting and general administrative operations.

In one embodiment, A method for processing a data packet comprises, when processing the data packet with a packet processing engine of a network device, generating one or more events with one or more of a plurality of pipelined packet processing units of the packet processing engine and determining, with the one or more of the plurality of pipelined packet processing units, whether to associate one or more of a trap and a sampling class with the data packet based on the generated events. The trap indicates that the packet is to require special handling by a special handling unit external to the packet processing engine of the network device, while the sampling class indicates that the packet is to be copied by the network device to form a duplicate packet. The method further comprises setting, with the one or more of the plurality of pipelined packet processing units, one or more bits of a vector that is passed between the plurality of pipelined packet processing units to associate the packet with the determined trap or sampling class in response to the events; and processing the packet with the packet processing engine based on the set one or more bits of the vector.

In another embodiment, a network device for processing a data packet comprises a packet processing engine that includes a plurality of pipelined packet processing units and a special handling unit external from the packet processing engine. The plurality of packet processing units, when processing the data packet, generate one or more events, determine whether to associate one or more of a trap and a sampling class with the data packet based on the generated one or more events, set one or more bits of a vector that is passed between the plurality of pipelined packet processing units to associate the packet with the determined trap or sampling class, and processes the packet based on the set one or more bits of the vector, wherein the trap indicates that the packet is to require special handling by the special handling unit, and wherein the sampling class indicates that the packet is to be copied to form a duplicate packet.

In another embodiment, A non-transitory computer-readable medium comprising instructions that, when executed, cause one or more of a plurality of packet processing units of a packet processing engine to determine whether to associate one or more of a trap and a sampling class with the data packet based on one or more events generated by the one or more of the plurality of packet processing units when processing a data packet, wherein the trap indicates that the packet is to require special handling by a special handling unit external to the packet processing engine of the network device, and wherein the sampling class indicates that the packet is to be copied to form a duplicate packet, set one or more bits of a vector that is passed between the plurality of pipelined packet processing units to associate the packet with the determined trap or sampling class and process the packet based on the set one or more bits of the vector.

The details of one or more embodiments of the flexibly packet processing techniques are set forth in the accompanying drawings and the description below. Other features, objects, and advantages of these techniques will be apparent from the description and drawings, and from the claims.

DETAILED DESCRIPTION

Figure 1:
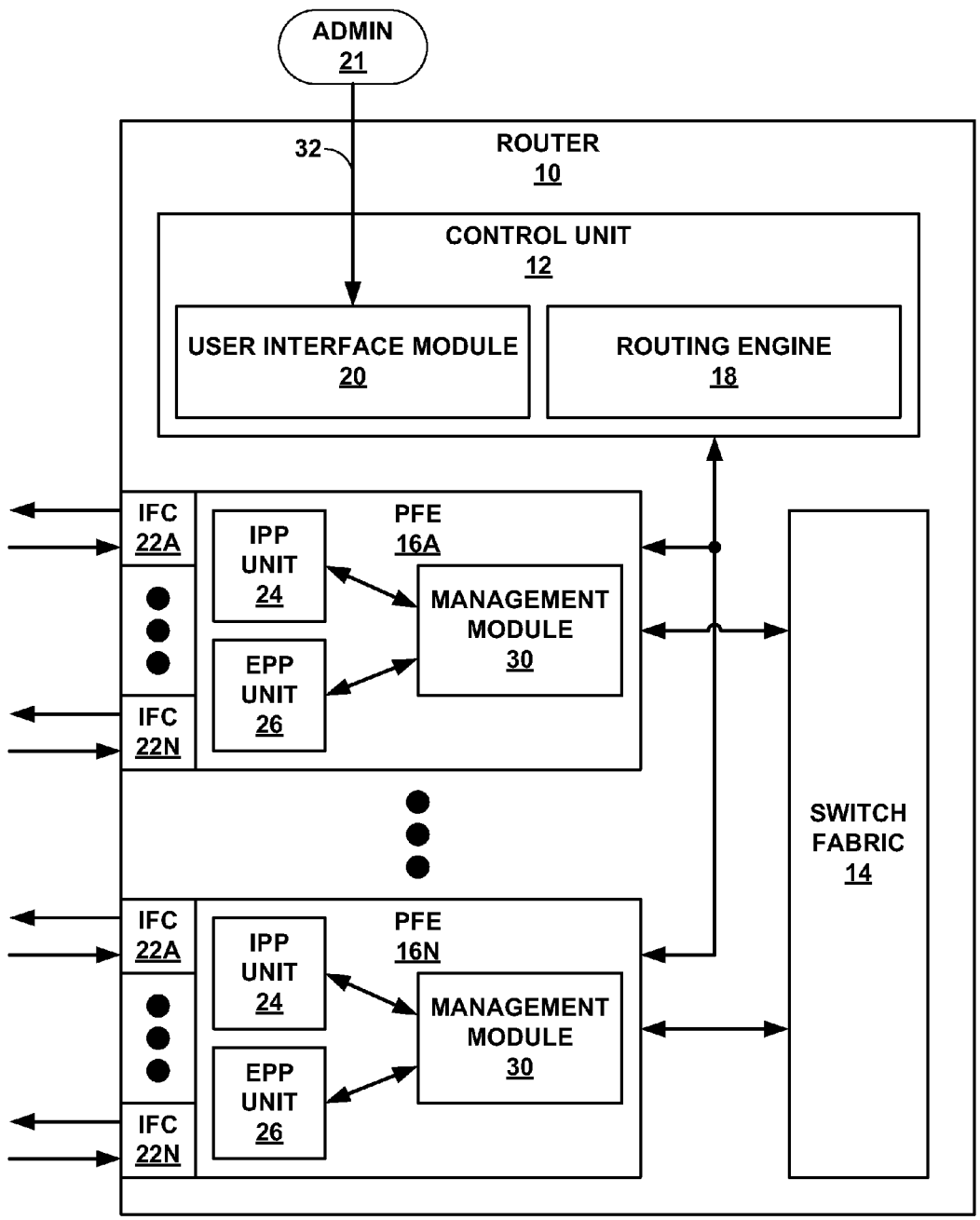
FIG. 1 is a block diagram illustrating an example router that implements the techniques described in this disclosure to more flexibly process data packets.

FIG. 1 is a block diagram illustrating an example router 10 that implements the techniques described in this disclosure to more flexibly process data packets. While described with respect to a particular network device, i.e., router 10, in this disclosure, the flexible packet processing techniques described in this disclosure may be implemented by any network device capable of processing data packets. The techniques should therefore not be limited to the example shown in FIG. 1.

As shown in FIG. 1, router 10 includes a control unit 12, a switch fabric 14 and a plurality of packet forwarding engines (PFEs) 16A-16N. Control unit 12 may represent one or more processors (not shown in FIG. 1) that execute software instructions, such as those used to define a software or computer program, stored to a non-transitory computer-readable medium (again, not shown in FIG. 1), such as a storage device (e.g., a disk drive, or an optical drive), or memory (such as Flash memory, random access memory or RAM) or any other type of volatile or non-volatile memory, that stores instructions to cause, when executed, one or more processors to perform the techniques described herein. Alternatively, control unit 38 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Often, even when implemented as dedicated hardware, the dedicated hardware supports execution of software that may implement one or more aspects of the techniques described in this disclosure. The techniques may therefore generally be implemented in hardware or a combination of hardware and software.

Control unit 12 includes a routing engine 18 that provides control plane functionality for router 10. Routing engine 26 generally represents a module that provides control plane functions in the form of storing network topology as so-called "routing tables," executing routing protocols to communicate with peer routing devices and thereby maintain and update the routing tables, and providing a management interface to allow user access and configuration of router 10. This management interface is shown in the example of FIG. 1 as user interface module 20. Control unit 20 includes user interface module 20 to facilitate communication with a user of router 10 which, in the example of FIG. 1, is shown as administrator (admin) 21 ("admin 21"). User interface module 20 may represent any common type of user interface, including a command line interface (CLI) or a graphical user interface (GUI). User interface module 20 may include any interfaces necessary to interact with components for entering data to router 10, such as a keyboard, monitor, mouse, touchscreen display.

Switch fabric 14 provides a high-speed interconnect for forwarding incoming data packets to the correct one of PFEs 16 for transmission over a network, such as the large public network commonly referred to as the "Internet." PFEs 16 receive and send data packets via associated interface cards (IFCs) 22A-22N ("IFCs 22"). IFCs 22 may each represent an interface or port between a communication link and router 10 by which router 10 sends and receives data packets. Although not shown PFEs 16 may include a control unit similar to control unit 12, where this control unit may comprise a combination of dedicated hardware specially designed for packet processing and a central processing unit (CPU) for configuring this dedicated hardware and otherwise enabling communication between routing engine 18 and this dedicated hardware. IFCs 22 and PFEs 16, in combination with switch fabric 14, may form a "data plane" that is responsible for forwarding data packets in accordance with forwarding information.

PFEs 16 each include an ingress packet processing (IPP) unit 24 ("IPP unit 24"), an egress packet processing (EPP) unit 26 ("EPP unit 28") and a management module 30. IPP unit 24 represents a unit that performs ingress packet processing on data packets received by IFCs 22. Ingress packet processing may include parsing the packet to extract header and potentially payload data from the packet, performing a source lookup for accounting or management reasons, filtering the packet to change various aspects of the packet or otherwise drop or discard packets, and performing a destination lookup to identify one of IFCs 22 over which to forward the packet. Egress packet processing (EPP) unit 26 represents a unit that performs egress packet processing on data packets received by IFCs 22, where egress packet processing may be substantially similar to ingress packet processing, except for minor differences in egress packet processing that considers transmission buffers which is not a concern of ingress packet processing. Management module 30 represents a module that facilitates the configuration of IPP unit 24 and EPP unit 26 and otherwise provides an interface by which control unit 12 may interface with a corresponding one of PFEs 16.

In operation, IFCs 22 receive data packets and buffer these packets until respective ones of PFEs 16 may process these packets. IPP unit 24 retrieves the packets from the buffer and performs ingress packet processing to process the retrieved packets. In performing ingress packet processing, IPP unit 24 determines a destination to which this packet is to be sent and resolves this destination as a so-called "next hop." The term "next hop" typically refers to data identifying one of IFCs 22 over which to send the packet so as to reach the packet's intended destination. Routing engine 18 may maintain a routing information base (RIB; which is not shown in FIG. 1) that identifies all routes through the network in which router 10 resides. Routing engine 18 may resolve these routes into forwarding information that associates destinations with these next hops and installs this forwarding information or a portion thereof into each of PFEs 16. PFEs 16 may perform a destination lookup using the parsed destination address to identify this next hop and then forwards this packet to the determined next hop (which is another one of IFCs 22) via switch fabric 14. The one of PFEs 16 associated with the next hop receives this packet and invokes its EPP unit 26 to perform egress packet processing. After performing egress packet processing, EPP unit 26 forwards the packet to the next hop.

Typically, IPP units and EPP units, when performing their respective ingress and egress packet processing, generate events that identify various aspects of the packets. Typically, microcode executed by each of these units assesses each event and determines whether to associate this packet with a trap or sampling class based on the events. The term "trap" generally refers to any condition that may require special processing in contrast to ordinary packet processing (which may involve determining a destination to which the packet is to be sent and forwarding the packet to that destination). For example, some software traps are used for control packets (where the phrase "control packets" may refer to packets used in the control or routing of data packets) which software wants to redirect, intercept or snoop. Some software traps, as another example, are used for security/access control. In other examples, some software traps may indicate a lookup failure which requires special handling. In still other examples, traps may comprise hardware traps denoting a packet check failure, hardware errors, etc. The term "sampling" refers to the act of copying a packet. A so-called "sampling class" defines a particular type of sampling in term of a frequency of sampling, a number of packets to sample, and other sampling metrics.

To illustrate this operation, an IPP unit may, when performing ingress packet processing, identify a malformed packet header. This IPP unit may then generate a malformed packet header event, passing this event to microcode executed by the IPP unit. This microcode may then determine that this event is fatal to continued packet processing and generate a trap based on this malformed packet header event. The microcode associates the packet with this trap, which may cause the underlying hardware to immediately drop or quarantine the packet, depending on the implementation. Even if the underlying hardware is configured to continue processing this packet in a normal manner, the IPP unit may generate events that are evaluated by the microcode executed by the IPP unit. The microcode in this instance may determine that this packet is associated with a given sampling class based on these generated events, whereupon IPP unit may generate a copy of this malformed packet, storing this packet to a log or buffer for later consideration by admin 21.

Yet, in certain instances, admin 21 does not want to sample malformed packets that could be corrupt or otherwise attempt malicious activities. For example, admin 21 may sample packets for a given virtual private network (VPN) to confirm that only packets having IP domains that belong to that VPN are being sent. Sampling malformed packets that may be corrupted would not help in verifying whether the VPN is correctly configured. Yet, conventional packet processing units, either IPP units or EPP units, do not provide much flexibility in enabling admin 21 in defining how to handle traps, interactions between various different traps, interaction between various different sampling classes, and interactions between traps and sampling classes. Instead, typical packet processing involves a series of hardwired treatments of traps and/or sampling classes that may only be enabled or disabled by admin 21. With little to no flexibility in defining traps and sampling classes, admin 21 may experience difficulties in troubleshooting issues, configuring services and performing other general administrative operations, as only select traps and sampling classes may be supported by any given router.

Typically, the handling of traps and sampling classes is hardwired due to the complexity of packet processing. Packet processing involves a number of different operations, which may be considered as functional blocks that form a packet processing engine or structure. These functional blocks each implement some aspect of packet processing, such as parsing, source lookup, filtering and destination lookup. The functional blocks are traditionally arranged in a pipelined manner to create a pipelined packet processing structure. Thus, each functional block may, at any one time, process a different packet, passing their packets to the next functional block along the pipeline, along with other metadata. Each packet then proceeds through each functional block (which may also be referred to as a "stage" of the pipeline) until processing is complete. In addition, high-performance packet processing devices, such as core routers, may be required to handle millions of packets per second with latencies on the order of a microsecond. Processing potentially millions of packets in this manner may further increase the complexity.

While hardware, such as application specific integrated circuits (ASICs), may be designed to accomplish almost any algorithm, there are limitations with respect to the development of dedicated hardware, such as the number of input or output ports for a given sized ASIC and the number of transistors and/or other components capable of being implements for a given silicon footprint. Given that current packet processing typically requires a significant number of operations to be performed in a given cycle to achieve packet throughput rates of approximately 200 million packets per second (200 Mpps), packet processing units may run up against these design limitations, forcing packet processing to be distributed over multiple dedicated hardware units or chips.

As a result of this fractured hardware design where functional blocks are spread across different dedicated hardware units or chips, each functional block generally handles traps and/or sampling classes before passing the packet to a subsequent functional block in the pipeline that is implemented in a different dedicated hardware chip. This arises due to limitations in storing packets on-chip such that these packets can be copied in response to associating this packet with a sampling class. Each chip has only so much memory and/or memory throughput to handle such copies and, therefore, each chip cannot buffer the packets necessary to delay trap and packet handling until packet processing is complete. For this reason, dependencies between generated traps and/or sampling classes cannot be resolved given that each trap has to be handled prior to passing this packet to a different functional block, which itself may detect traps and/or sampling classes. For this reason, packet processing may not, when implemented, provide much flexibility in terms of allowing user or administrator control over traps and sampling classes.

In accordance with the techniques described in this disclosure, IPP and EPP units 24, 26 may provide for flexible packet processing to promote significantly more control over the detection and handling of traps, the detection and handling of sampling classes, the interactions between different traps, the interactions between different sampling classes and the interaction between traps and sampling classes in comparison to conventional packet processing implementations. Rather than attempt to resolve traps and sampling requirements for each data packet at each functional block along the pipelined packet processing engine as is common in conventional, the techniques may provide for a packet processing pipeline that delays decisions with regard to traps and sampling until the end of the pipeline, when all of the various functional blocks within the pipeline have had an opportunity to set traps for and configure sampling of the data packet. The delay is enabled through advances in ASIC design and implementation of packet processing, which enable core functional units of each of IPP and EPP units 24 to be implemented on a single dedicated hardware unit or chip.

By delaying these decisions until packet processing for this data packet (or a portion thereof, such as ingress packet processing or egress packet processing) is complete, the techniques may enable flexible treatment with regard to the various set traps and sampling classes (which, again, denotes how sampling is to occur and where the sampled packets are to be sent). The techniques may also expose a user interface by which a user may define what operations to take with regard to certain traps (such as ignore the trap), how traps impact sampling, and how different sampling classes behave with respect to one another. In this respect, the techniques may provide for a form of flexibly packet processing that promotes data collection, troubleshooting and general administrative operations.

To illustrate, control unit 12 may initially invoke user interface module 20 to present a user interface by which to receive configuration data 32 from admin 21 that defines associations between each of the one or more events and each of the traps and each of the sampling classes. Configuration data 32 may also define handling of interactions between traps and/or sampling classes, which is described below in more detail. In any event, upon receiving configuration data 32, user interface module 20 may communicate configuration data 32 to routing engine 18, which proceeds to pass this configuration data 32 or some version thereof (such as in instances where routing engine 18 alters, translates or otherwise edits configuration data 32) to management modules 30 executing within each of PFEs 16. These management modules 30 then interface with their respective ones of IPP units 24 and EPP units 26 to configure software executed by the plurality of pipelined packet processing units represented as IPP units 24 and EPP units 26 in the example of FIG. 1 to associate the one or more events to the trap or the sampling class in accordance with the association defined by the configuration data.

Once configured, IPP units 24 and EPP units 26 may begin processing data packets received via their corresponding ones of IFCs 22 and/or switch fabric 14. When processing a data packet, IPP unit 24 of PFE 16A for example may generate one or more events. More specifically, one of the pipelined packet processing units that form this IPP unit 24 may generate one or more events when processing the data packet received via one of the corresponding ones of IFCs 22. These events may include detecting, to provide a few examples, an illegal header length for a variety of protocols, an Internet Protocol version four (IPv4) illegal version, an IP version 6 (IPv6) unsupported extension header, and any number of other events including hardware events, such as buffer full or overrun events, counter or log events, divide by zero events or any other hardware event.

Typically, each of the pipelined packet processing units execute microcode that process these events so as to determine whether to associate one or more of a defined trap and a defined sampling class with the data packet based on the generated one or more events. Management modules 30 configure the microcode to associate certain events with traps and/or sampling classes using configuration data 32 in the manner noted above. The microcode therefore determines whether to associate the one or more of the traps and/or sampling classes with the packet using the associations defined by configuration data 32 in view of the events. The microcode defines this association by setting one or more bits of a bit vector that is passed between the plurality of pipelined packet processing units forming IPP unit 24. In this manner, the microcode updates a bit vector defined for each packet to associate the packet with the determined one or more traps and/or sampling classes.

IPP unit 24 then, after processing the packet, determines whether to copy the data packet based on the one or more bits of the vector. In some instances, IPP unit 24 maps one or more of the associated traps to a sampling class. In these instances, the bit vector comprises a first portion to define associated traps and a second portion to define associated sampling classes. IPP unit 24 may map the first portion of the bit vector that defines associated traps to the second portion of the bit vector that defines associated sampling classes. In this trap mapping instance, management module 30 may configure IPP unit 24 in accordance with configuration data 32 to define how to resolve each of the associated sampling classes in view of the other associated sampling classes.

In one example implementation, admin 21 may define for each sampling class a priority of that sampling class with respect to every other sampling class. Those sampling classes that have a lower priority may be cleared or reset by those sampling classes that have a higher priority. To further provide flexibility, those sampling classes having a lesser priority may override the clearing or reset ability of one or more of the sampling classes that have higher priority. Thus, when evaluating the sampling class bit vector, assuming traps were mapped to sampling classes denoted by this sampling class bit vector, IPP unit 24 may evaluate a first, highest priority, associated sampling class, which may instruct IPP unit 24 to clear any of the associated sampling classes having a lower priority. IPP unit 24 may then proceed to clear those associated sampling classes, except for those lower priority associated sampling classes that specifically provide an override with respect to this highest priority sampling class. IPP unit 24 may continue to evaluate the next highest priority associated sampling class, assuming any remain after clearing or resetting the lower priority associated sampling classes (meaning that these lower priority sampling classes overrode the clear operation requested by the higher priority sampling class). IPP unit 24 may then copy or sample the packet in accordance with the sampling metrics of each associated sampling class. In this manner, IPP unit 24 determines whether to copy the data packet based on the one or more bits of the vector.

While described above with respect to IPP units, EPP units may, as noted above, be similarly configured to operate in manner similar to that of these IPP units. The techniques should not be limited to IPP units but may be similarly implemented by EPP units, as described below in more detail with respect to FIG. 3

Figure 2:
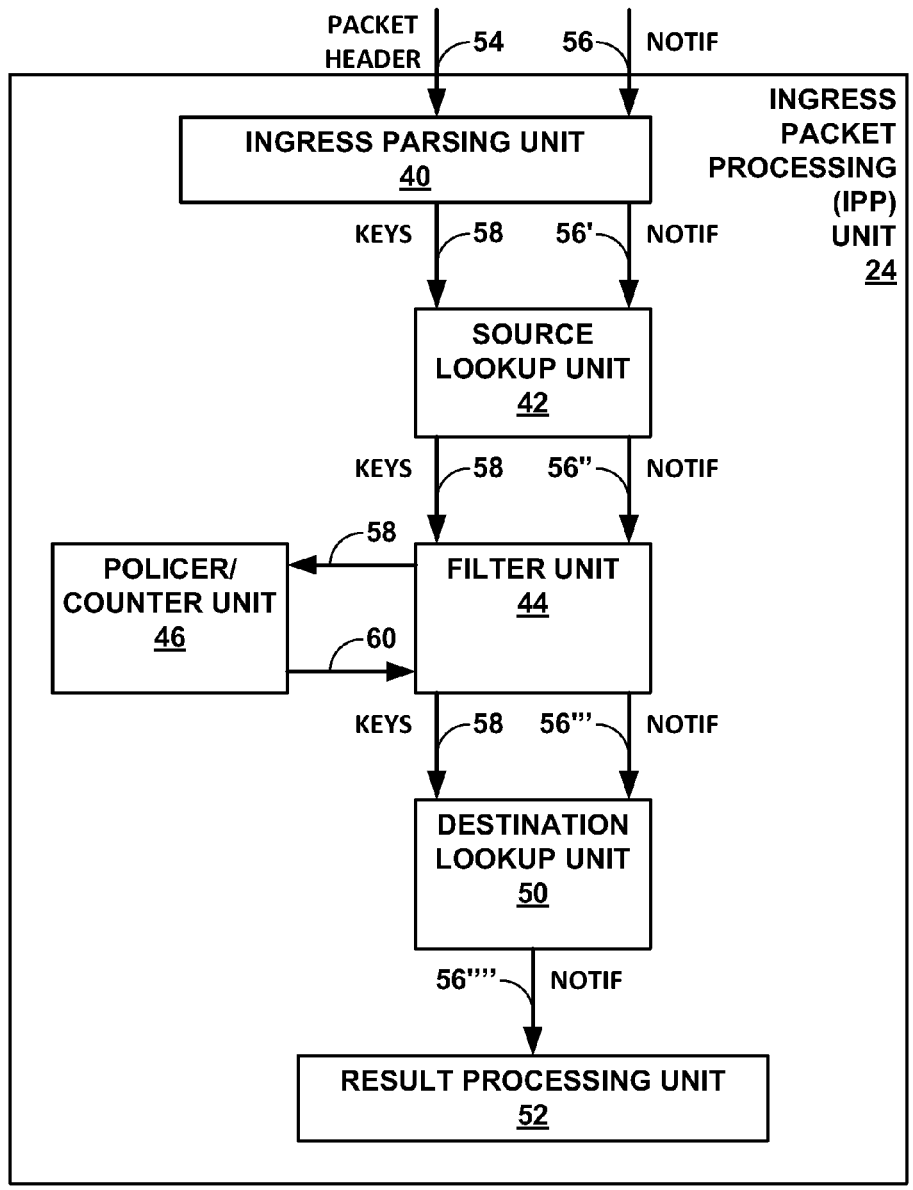
FIG. 2 is a block diagram illustrating one of the ingress packet processing (IPP) units shown in the example of FIG. 1 in more detail.

FIG. 2 is a block diagram illustrating one of ingress packet processing (IPP) units 24 shown in the example of FIG. 1 in more detail. As shown in the example of FIG. 2, IPP unit 24 includes a number of functional blocks 40-52, which are referred to as units. Units 40-52 represent the functional blocks of a dedicated hardware chip or structure, such as an ASIC. Each of these units 40-52 may execute microcode or a portion of microcode. Microcode refers to assembly or other low-level code that conforms to an open or proprietary assembly, machine or other low-level programming language. Typically, microcode is optimized to execute on the dedicated hardware and provides superior performance compared to assembly, machine or other low-level code compiled from a high-level programming language.

While described in the context of dedicated hardware chip and microcode, the techniques may be implemented in any manner, such as by using a general purpose central processing unit (CPU) that executes assembly, machine or other low-level code compiled from high-level code. Moreover, while one or more of units 40-52 may reside on the same dedicated hardware chip, one or more different ones of units 40-52 may reside on a different chip or as a stand-alone chip. These units 40-52 not implemented on the same chip may represent interfaces or other communication media between the chip that provides core packet processing functionality and the supporting chips. Generally, those chips that do not reside on the chip that provides core packet processing functionality may not associate the packet with any traps or sampling glasses for reasons discussed above. These supporting functional units however may generate events, which microcode executing on those of the core packet processing units may base the association of the packet with traps and/or sampling classes.

Ingress parsing unit 40 generally represents a first one of the function units forming packet processing pipeline that provides core packet processing functionality. Ingress parsing unit 40 receives a packet header 54 from a packet currently undergoing ingress packet processing and what is generally referred to as a notification 56 ("notif 56"). Notification 56 includes a bit vector having a first portion that associates the current packet with traps and a second portion that associates the current packet with sampling classes. Each bit of the first portions, when set, associates the current packet with a different trap. Each bit of the second portion, when set, associates the current packet with a different sampling class. Typically, the first portion includes 64 bits for associating the current packet with 64 different traps, while the second portion includes 128 bits for associating the current packet with 128 different sampling classes.

Ingress parsing unit 40 parses various portions of packet header 54 to extract header data. For example, ingress parsing unit 40 may extract optional service header fields, layer 2 (e.g., Ethernet) keys, layer 3 (e.g., IPv4, IPv6, FC, multiprotocol label switching (MPLS)) keys, and layer 4 (e.g., transmission control protocol (TCP) or universal datagram protocol (UDP)) keys. The term "keys" generally refers to different types of data depending on the context. For example, a L2 key may comprise a source media access control (MAC) address and a destination MAC address. L3 keys, to illustrate the difference when the context is shifted to L3, may include a source IP address, a source IP port, a destination IP address, a destination port and a protocol version. This data is referred to as "keys" because it uniquely identifies the current packet and forms the basis upon which router 10 determines to apply one or more services or perform other operations.

In any event, ingress parsing unit 40 may control packet classification, perform semantic parsing of overloaded Ethernet Type ("EthType") tags and generate load balancing hashes for use in next hop resolution. Ingress parsing unit 40 may generate any number of events with regard to the proper format of this extracted header data, the content of the header data (e.g., multicast IP address events, broadcast IP address events), and any other type of event that may generally be detected through analysis of parsed header data. Microcode executed by ingress parsing unit 40 may handle these events in accordance with configuration data 32 so as to associate the current packet with one or more traps and/or sampling classes. Admin 21 may define any type of association. For example, admin 21 may want to sample any packet with a malformed packet header 54. Thus, admin 21 may input configuration data 32 associating any event suggesting a malformed packet header, such as an IPv4 header checksum event, with a sampling class that indicates that only packets from which these types of events are generated are signaled. This microcode, once updated with this configuration data 32, may process these events by setting the bits in notification 56 associated with the sampling class. Ingress parsing unit 40 then outputs updated notification 56' and keys 58 (e.g., such as L2, L3, and/or L4 keys).

Source lookup unit 42 may represent the second functional unit in the packet processing pipeline. Source look up unit 42 may provide core packet processing functionality by applying port-based per-control packet class actions, determining an port over which the current packet was received (e.g., a port of one of IFCs 22), determining a L2 domain, applying L2 domain based per control packet class actions, determining MPLS cross-connect-circuit (CCC), performing a spanning tree protocol (STP) check, determining whether the current packet is associated with a L3 virtual private network (L3VPN), as well as, perform any number of other operations to classify or otherwise identify the source of the current packet.

Once again, source lookup unit 42 may generate events and execute microcode that handles these events. This source lookup microcode may handle the events in accordance with configuration data 32 by setting one or more bits of the bit vector shown in the example of FIG. 2 as notif 56 so as to associate the current packet with one or more traps and/or sampling classes. Source lookup unit 42 may output keys 58 and twice-updated notif 56 to filter unit 44.

Filter unit 44 represents a unit that may be included within the functional units that form IPP unit 24. In some instances, however, filter unit 44 may represent a block external from IPP unit 24. Consequently, filter unit 44 may represent, in these instances, an interface to an off-chip filter unit. Regardless, filter unit 44 may update, change, remove or otherwise edit various aspects of keys 56, such as a L2 domain and a L3VPN tag. Filter unit 44 may pass keys 58 to policier/counter unit 46, which may maintain packet counts associated with certain flows (where a flow, for example, is identified by an IP five-tuple comprising a source address, a source port, a destination address, a destination port, and a protocol). Policier/counter unit 46 may retrieve various data associated with a flow, a source address (extracted from keys 58), a destination address (extracted form keys 58), as well as, any other data capable of being retrieved using data extracted from keys 58. Policer/counter unit 46 may aggregate this data to determine a total bandwidth usage per customer, per flow or per some other level of granularity and then compare this total bandwidth usage to bandwidth guarantees and limits agreed to by the customer when subscribing to its various services. Policier/counter unit 46 may reply to keys 58 with an indication 60 that indicates filter unit 44 should drop the packet. Policier/counter unit 46 may respond with this indication 60 when, for example, a customer is attempting to exceed is subscribed-to data bandwidth limit. Filter unit 44 may then cause IPP unit 24 to discard this packet from a packet buffer that temporality stores incoming packets while being processed by IPP unit 24.

Filter unit 44 may also generate events, which the microcode executed by filter unit 44 may process to set one or more traps and/or one or more sampling classes within notification 56" in the manner similar to that described above with respect to source lookup unit 42 and ingress parsing unit 40. In this manner, filter unit 44 updates twice-updated notification 56" to generate a three-times-updated notification 56'". Filter unit 44 outputs keys 58 and three-times-updated notification 56'" to destination lookup unit 50.

Destination lookup unit 50 represents one of the plurality of core functional blocks that forms IPP unit 24. Destination lookup unit 50 may use keys 58 to determine an ingress nexthop, where the term "nexthop" refers to one of PFEs 16 to which the current packet is to be forwarded via switch fabric 14, or some other service card or other destination reachable via switch fabric 14. Destination lookup unit 50 typically parses a destination address from keys 58 and performs a lookup in the forwarding information base to determine the next hop based on this destination address. Destination lookup unit 50 may also generate events (such as an inability to determine a next hop) that the microcode executed by destination lookup unit 50 may handle in the manner similar to that described above with respect to units 40-44. That is, this microcode may set one or more bits within the bit vector of received notification 56'" so as to associate the current packet with one or more traps and/or one or more sampling classes. Destination lookup unit 50 outputs this four-times-updated notification as notification 56"" to result processing unit 52.

Result processing unit 52 represents another one of the function blocks that provides core IPP functionality. Result processing unit 52 may process notification 56"". Result processing unit 52 may first process the associated traps, which again denote special handling for the current packet. These traps may indicate that special handling is required with respect to an original packet, not a copy of the packet. After identifying an internal destination or nexthop that performs the special operations for the current packet, result processing unit 52 may map one or more of the associated traps to one or more sampling classes in accordance with configuration data 32. Result processing unit 52 may then proceed to consider the first set bit in the bit vector having the highest priority. Typically, the bit of the bit vector farthest to the left in the bit vector has the highest priority and the priority decreases incrementally from left to right along the bits of the bit vector. Result processing unit 52 may, in this instance, consider the farthest left bit of the bit vector that is set, identifying a sampling class associated with this set bit. Depending on how the sampling class was configured, result processing unit 52 may copy the packet. For example, admin 21 may define this sampling class such that it is associated with events generated when detecting that the packet header is malformed. Admin 21 may then associate this sampling class with a first action, where this first action comprises copying the packet and storing this packet to a particular log. Result processing unit 52 then signals that this packet should be copied and stored to the identified log and signals that this packet is to be removed from the buffer.

To continue the example, admin 21 may also configure this sampling class such that, when associated with the packet, any other lower priority sampling classes are to be cleared. Result processing unit 52 may then attempt to clear each of the other set bits of the bit vector defined by notification 56"". However, admin 21 may also define, for lower priority sampling classes an override that overrides the ability of higher-priority sampling classes to clear their corresponding set bits. To illustrate, consider the example above, only assume a bit was set that has a higher priority than this malformed packet sampling class. A critical error may, for example, have occurred when destination lookup unit 50 attempted to resolve the nexthop. Destination lookup unit 50 may have set a trap that was subsequently mapped to a higher priority sampling class than the malformed packet sampling class. Admin 21 may have configured this higher priority sampling class so as to drop the packet and such that all sampling classes of lower priority were to be cleared. Admin 21 may, however, configure the malformed sampling class to override the attempts by higher priority sampling classes to clear its associated bit. Admin 21 may configure this malformed packet sampling class in this manner to ensure that all malformed packets were logged as the failure to resolve the nexthop may have occurred because the packet was malformed. Result processing unit 52 may therefore not clear the bit associated with the malformed sampling class in the bit vector of notification 56"" because of the override specified with respect to the malformed sampling class.

In this manner, the techniques may promote a high-level of flexibility in processing traps and/or sampling classes in comparison to conventional packet processing. Generally, admin 21 may define any type of trap and sampling class handling for devices that support these techniques, while also being to specify the interaction between traps, between sampling classes and between traps and sampling classes. Given the highly flexible nature of the techniques, admin 21 may define traps and sampling classes that permit a detailed view into many aspects of the packet processing process that were most likely previously unavailable in conventional packet processors. Consequently, admin 21 may gain insight into areas of packet processing that may facilitate detailed administration, configuration and troubleshooting of router 10.

In any event, when none of the traps and sampling classes are associated with the current packet, result processing unit 52 causes IPP unit 24 to forward the current packet from the memory to the nexthop determined by destination lookup unit 50. When one or more traps are associated with the packet, result processing unit 52 may drop the packet or forward the packet to a destination or nexthop internal to router 10 (such as a service card, routing engine or other internal destination different from one of PFEs 16) depending on how admin 21 configured handling of these traps. Whether the packet is identified as being dropped or not, result processing unit 52 may map one or more of the set traps to sampling classes so as to make copies of the current packet that resulted in the associated set traps, which may be useful for troubleshooting and other administrative operations. Result processing unit 42 may instruct ingress packet processing unit 24 to generate a copy of the current packet and forward the copy of the current packet to a location specified by configuration data 32. These locations may comprise dedicated storage devices included within router 10, which may reside on a service card coupled to switch fabric 14 in some instances or within one or more of PFEs 16. Regardless, result processing unit 52 may process the packet with the result being forwarding the packet without copying or sampling the packet, dropping the packet without forwarding the packet to its resolved nexthop, copying the packet one or more times and then dropping the packet, and copying the packet one or more times and forwarding the original packet to its resolved nexthop.

Figure 3:
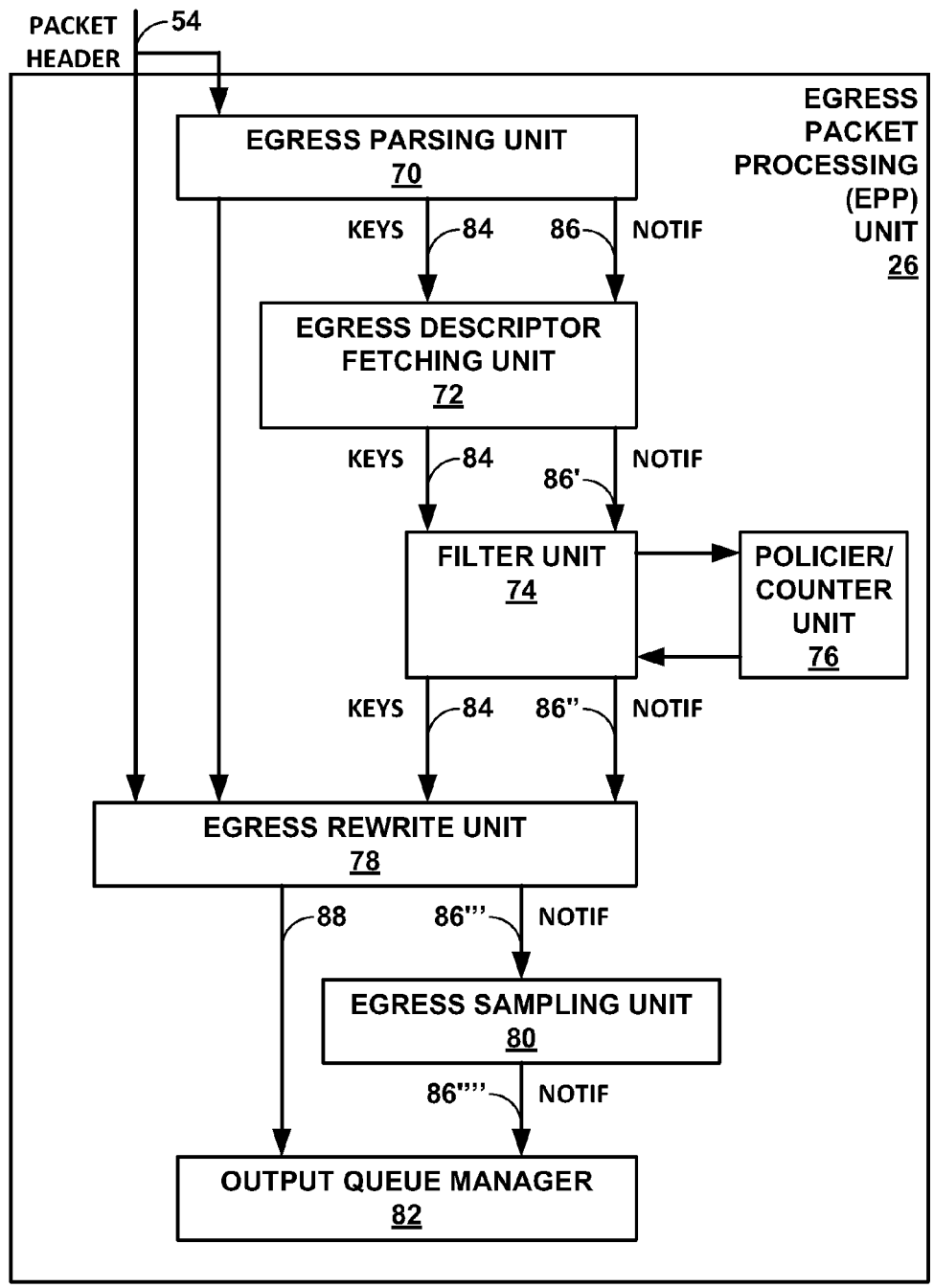
FIG. 3 is a block diagram illustrating one of the egress packet processing (IPP) units shown in the example of FIG. 1 in more detail.

FIG. 3 is a block diagram illustrating one of egress packet processing (IPP) units 26 shown in the example of FIG. 1 in more detail. As shown in the example of FIG. 3, EPP unit 24 includes a number of functional blocks 70-82, which are referred to as units. Units 70-82 represent the functional blocks of a dedicated hardware chip or structure, such as an ASIC. Each of these units 70-82 may execute microcode or a portion of microcode. Microcode refers to assembly or other low-level code that conforms to an open or proprietary assembly, machine or other low-level programming language. Typically, microcode is optimized to execute on the dedicated hardware and provides superior performance compared to assembly, machine or other low-level code compiled from a high-level programming language.

While described in the context of dedicated hardware chip and microcode, the techniques may be implemented in any manner, such as by using a general purpose central processing unit (CPU) that executes assembly, machine or other low-level code compiled from high-level code. Moreover, while one or more of units 70-82 may reside on the same dedicated hardware chip, one or more different ones of units 70-82 may reside on a different chip or as a stand-alone chip. These units 70-82 not implemented on the same chip may represent interfaces or other communication media between the chip that provides core packet processing functionality and the supporting chips. Generally, those chips that do not reside on the chip that provides core packet processing functionality may not associate the packet with any traps or sampling glasses for reasons discussed above. These supporting functional units however may generate events, which microcode executing on those of the core packet processing units may base the association of the packet with traps and/or sampling classes.

Egress parsing unit 70 represents one of a plurality of functional units that provide core egress packet processing functionality. Egress parsing unit 70 may represent itself a fixed latency pipeline that generates keys 84 from parsing packet header 54 (in a manner similar to that described above with respect to ingress parsing unit 40) and notification 86 while parsing packet header 54, where keys 84 and notification 86 may be similar in form to keys 58 and notification 56 described above with respect to IPP unit 24 shown in the example of FIG. 2. Egress parsing unit 70 may generate events, which the microcode executed by egress parsing unit 70 may process to associate one or more traps and/or one or more sampling classes with the current packet. This microcode, as noted above, may set one or more bits in a trap and/or sampling class portion of the bit vector included within notification 86. Egress parsing unit 70 outputs keys 84 and notification 86 to egress descriptor fetching unit 72. As shown in the example of FIG. 3, some header data, such as an L2 pass-through buffer is bypassed from egress parsing unit 70 to egress rewrite unit 78.

Egress descriptor fetching unit 72 represents another one of the plurality of function blocks that form a core portion of EPP unit 26. Egress descriptor fetching unit 72 may represent another fixed latency pipeline that provides flow control for egress parsing unit 70. Egress descriptor fetching unit 72 may issue, although not shown in the example of FIG. 2, policier/counter requests to policier/counter unit 76, which may be substantially similar to policier/counter unit 46 shown in the example of FIG. 2. Egress descriptor fetching unit 72 may fetch descriptors describing a port, a L2 domain, a L3VPN and other descriptors that may be necessary to properly forward the current packet to an external (as opposed to the internal nexthop determined when performing ingress packet processing) nexthop. Egress descriptor fetching unit 72 may generate events, which the microcode handles by setting one or more bits in the bit vector included within notification 86 so as to associate the current packet with one or more traps and/or one or more sampling classes in accordance with configuration data 32. Egress descriptor fetching unit 72 then outputs keys 84 and this once-updated notification 86' to filter unit 74.

Filter unit 74 may be substantially similar to filter unit 44. Like filter unit 44, filter unit 74 may not be included within the same chip as the other core units that form EPP unit 26. Filter unit 74 may also interface with policier/counter unit 76 similar to how filter unit 44 interfaces with policier/counter unit 46. Regardless, filter unit 74 may generate events that are then processed by the microcode executed by filter unit 74 to update notification 86 in a manner similar to that described above with respect to filter unit 44. Filter unit 74 forwards keys 86 and twice-updated notification 86" to egress rewrite unit 78.

Egress rewrite unit 78 represents another one of the core functional units that forms EPP unit 26. Egress rewrite unit 78 may rewrite packet header 54 to facilitate delivery of the current packet to its intended destination. Egress rewrite unit 78 outputs this rewritten packet header 88 to output queue manager 82. Egress rewrite unit 78 may also generate events, which microcode executed by egress rewrite unit 78 may process to set one or more bits in the bit vector of notification 86' so as to associate the current packet with one or more traps and/or one or more sampling classes. Egress rewrite unit 78 may output this three-times-updated notification as notification 86''' to egress sampling unit 80.

Egress sampling unit 80 represents another one of the core functional blocks that forms EPP unit 26. Egress sampling unit 80 may handle the set traps and/or sampling classes specified by the one or more set bits in the bit vector of three-times updated notification 86'''. Egress sampling unit 80 may handle these set traps and/or sampling classes in a manner substantially similar to result processing unit 52 of IPP unit 24 shown in the example of FIG. 2. Egress sampling unit 80 may alter or otherwise update this bit vector to clear or, even in some examples, set one or more bits of the bit vector defined by notification 86''' and outputs this four-times-updated notification 86'''' to output queue manager 82.

Output queue manager 82 represents a unit that may not form a core functional block of EPP unit 26. Output queue manager 82 may reside external from the chip that provides this core egress packet processing functionality. Output queue manager 82 may manage an output or transmit queue for each of associated ones of IFCs 22 (shown in the example of FIG. 1). Based on four-times-updated notification 86'''', output queue manager 82 may store updated packet header 88 to an appropriate one of these transmit queues and cause the payload of the packet (where payload refers to any data not included within packet header 54) to be stored after this updated packet header 88 to reform the current packet for delivery downstream. For example, if notification 86'''' indicates that this packet is to be dropped, output queue manager 82 causes the current packet to be removed from the buffer and does not store this reformed packet to the appropriate transmit queue. However, if notification 86'''' indicates that this packet is to be forwarded, output queue manager 82 stores this reformed packet to the appropriate one of the transmit queues.

Figure 4A:
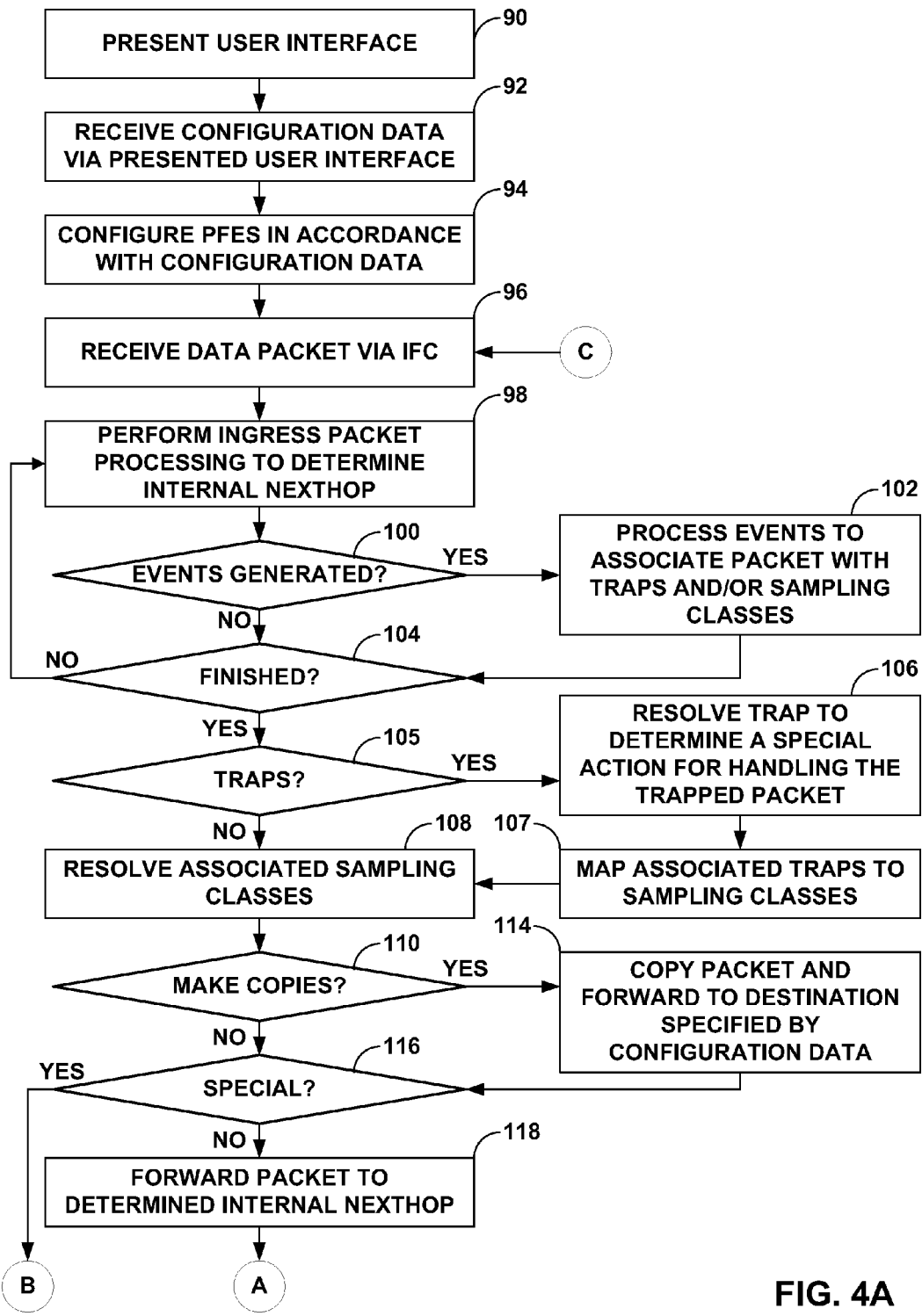
FIGS. 4A-4C are flowcharts illustrating example operation of an ingress packet processing (IPP) unit and an egress packet processing (EPP) unit in processing data packets in accordance with the flexible packet processing techniques described in this disclosure.
Figure 4B:
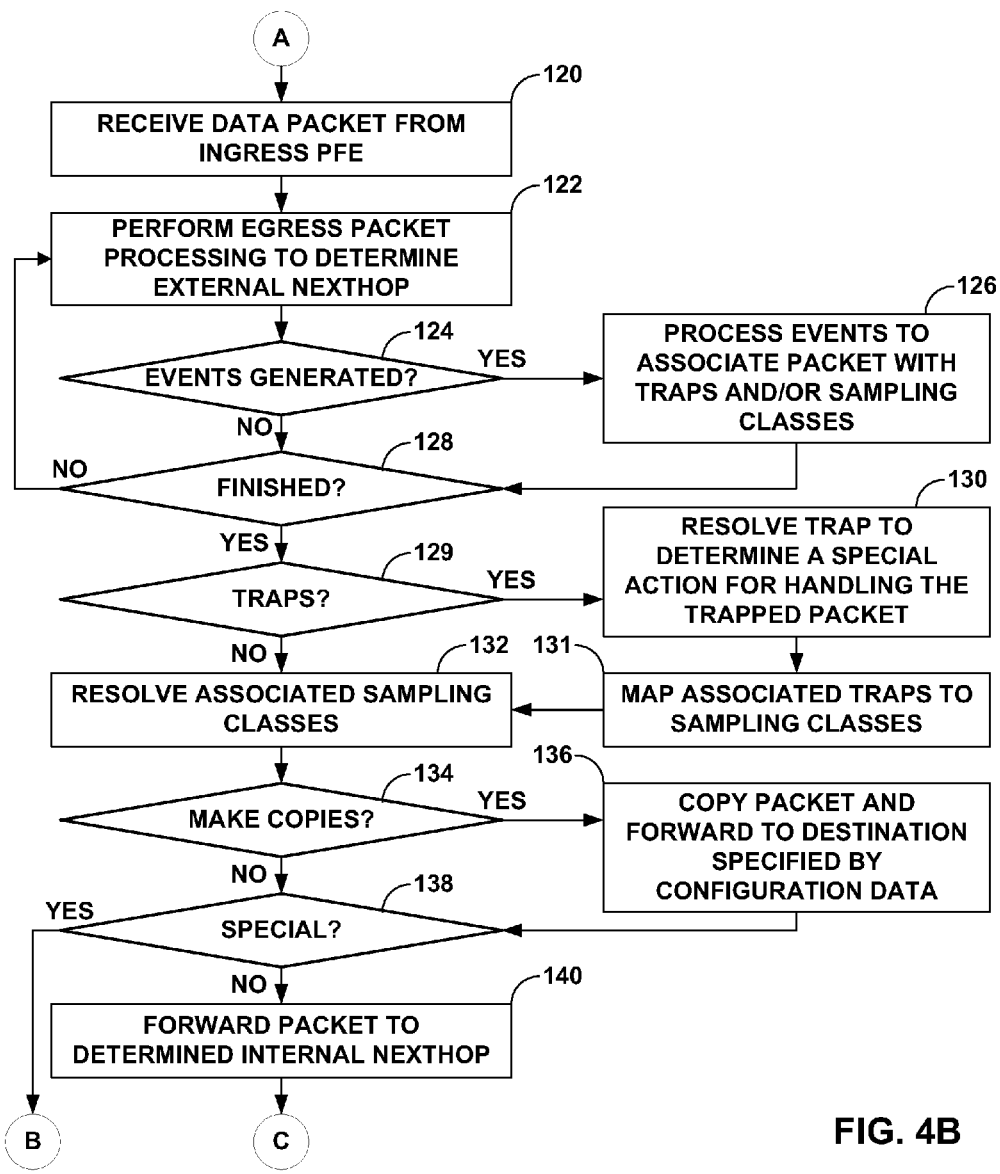
Figure 4C:
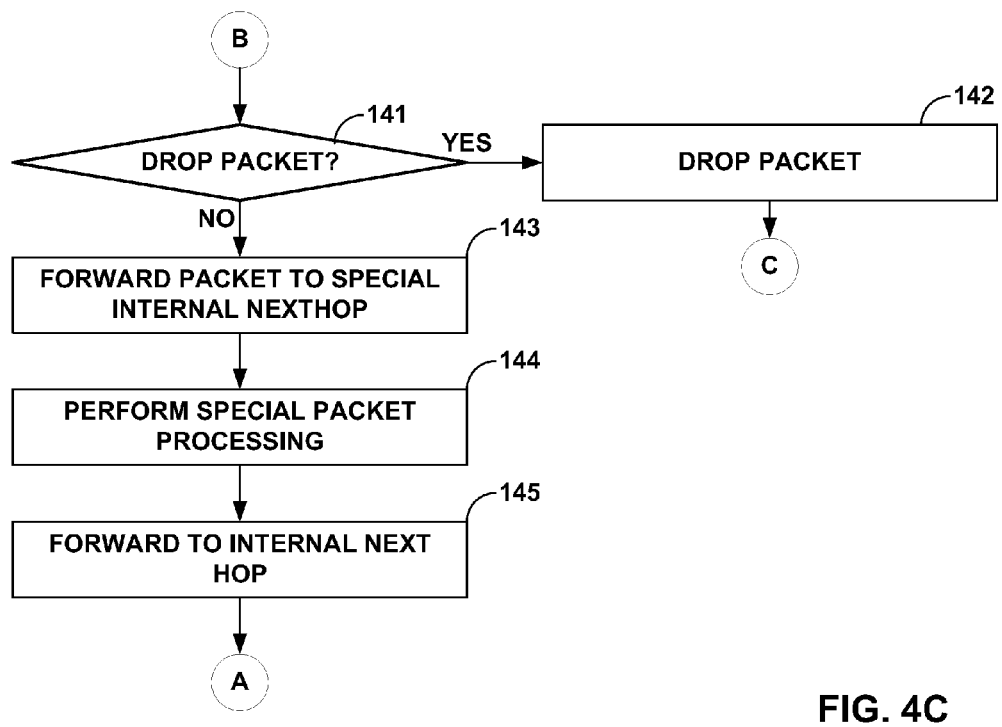

FIGS. 4A-4C are flowcharts illustrating example operation of an ingress packet processing (IPP) unit, such as IPP unit 24 shown in the example of FIGS. 1 and 2, and an egress packet processing (EPP) unit, such as EPP unit 26 shown in the example of FIGS. 1 and 3, in processing data packets in accordance with the flexible packet processing techniques described in this disclosure. Referring first to FIG. 4A, user interface module 20 executed by control unit 12 of router 10 initially presents a user interface with which admin 21 may interface to enter configuration data 32 in the manner described above (90). User interface module 20 receives configuration data 32 via the presented user interface from admin

21 (92). User interface module 20 may communicate this configuration data 32 to routing engine 18, which may interface with management modules 30 of PFEs 16 to forward configuration data 32 or some portion thereof to PFEs 16. Management module 30 configure PFEs 16 and, more specifically, IPP units 24 and EPP units 26, in accordance with configuration data 32, as described above (94). Once configured, IPP units 24 may receive data packets via corresponding ones of IFCs 22 (96).

Focusing on IPP unit 24 of PFE 16A for purposes of illustration, this IPP unit 24 performs ingress packet processing in the manner described above with respect to FIG. 2 to determine an internal nexthop (which for example may direct the packet to an egress one of PFEs 16 different than PFE 16A) for the current packet it is processing (98). Typically, each of pipelined functional units 40-52 of IPP unit 24 may generate one or more events (100). When one of these pipelined functional units 40-52 generates an event ("YES" 100), microcode executed by these pipelined functional units 40-52 may process the generated events to associate the packet with one or more traps and/or one or more sampling classes in accordance with configuration data 32, again as described above (102). If the one of units 40-52 that generated the event is not the final unit in the pipeline (meaning IPP unit 24 has not finished processing the current packet or that processing has not been finished early as may occur upon trapping the packet; "NO" 104), the remaining ones of units 40-52 may continue to perform their aspects of ingress packet processing, potentially generate events or not ("NO" 100) and execute microcode to process the events (102) until the final one of units 40-52 (i.e., unit 52 in this example) has finished processing the current packet ("YES" 104).

Once finished, result processing unit 52 may first determine whether any traps have been associated with the current packet (105). If one or more traps have been associated with the current packet, as denoted by the trap portion of the vector included within notification 56"'' ("YES" 105), result processing unit 52 may resolve these traps to determine a special action for handling the trapped packet (106). This special action may comprise dropping the packet or determining a special internal nexthop that is to perform the special handling of this packet (such as a service card). When two or more traps are associated with the current packet, result processing unit 52 may resolve these traps in a manner similar to resolving associated sampling classes as described above. That is, each trap may be assigned a priority which is expressed by its bit position within the trap portion of the bit vector included within notification 56"''. Result processing unit 52 may consider the highest priority associated trap and determine whether to, for example, drop the packet or determine a special internal nexthop for processing the packet. Configuration data 32 may specify whether, when handling this trap, all lower priority traps are to be cleared. Configuration data 32 may also specify for the other set traps an override to prevent higher priority traps from clearing this lower priority trap configured with an override. In any event, result processing unit 52 may mark this packet as special and associate the packet with the special action.

After resolving the traps, result processing unit 52 may map any traps associated with the current packet via the set bits of the trap portion of the bit vector included within notification 56"'' remaining after resolving these traps to one or more sampling classes in the manner described above (107). Result processing unit 52 may then resolve the sampling classes associated with the current packet, as described above (108). That is, result processing unit 52 may sequentially assess each of the associated sampling class in order of decreasing priority, clearing any associated sampling classes of lower priority than the sampling class currently under assessment when admin 21 has configured this sampling class in this manner. Moreover, when attempting to clear these lower priority sampling classes, result processing unit 52 may encounter overrides with respect to other associated, but lower priority, sampling classes that override any attempts by a higher priority sampling class to clear its associated bit.

If one or more sampling classes are associated with the packet, then result processing unit 52 causes IPP unit 24 to make a copy or otherwise sample this current packet as well as potentially other subsequent packets associated with the same flow or session ("YES" 110). If no sampling classes are associated with the current packet, result processing unit 52 does not cause IPP unit 24 to make any copies of the packet ("NO" 110). Assuming at least one sampling class is associated with the current packet ("YES" 110), result processing unit 52 may cause IPP unit 24 to copy the current packet and forward this copy of the current packet to a destination specified by configuration data 32, where this destination may include a log, a database, a service plane, a service card, a security card or any other destination to which sampled packets are commonly communicated or stored (114). Result processing unit 52 may cause IPP unit 24 to make multiple copies of the packet in some instances when multiple different sampling class bits in the bit vector remain set after resolving each associated sampling class.

After causing IPP unit 24 to make any copies of the current packet in accordance with associated sampling classes, result processing unit 52 may then determine if the packet has been previously marked as special (116). If result processing unit 52 determines that this packet has not been marked as special ("NO" 116), result processing unit 52 forwards this current packet to the determined internal next hop (which in this instance is assumed to be another one of PFEs 16, such as PFE 16N; 118).

Referring to FIG. 4B, PFE 16N, in this example, receives the current data packet from ingress PFE 16A via switch fabric 14 (120). PFE 16N may store this packet to a buffer or other memory, passing the packet header of this current packet to EPP unit 26. EPP unit 26 performs egress packet processing in the manner described above with respect to FIG. 3 to determine an external nexthop (which for example may direct the packet to one of IFCs 22) for the current packet it is processing (122). Typically, each of pipelined functional units 70-82 of EPP unit 26 may generate one or more events (124). When one of these pipelined functional units 70-82 generates an event ("YES" 124), microcode executed by these pipelined functional units 70-82 may process the generated events to associate the packet with one or more traps and/or one or more sampling classes in accordance with configuration data 32, again as described above (126). If the one of units 70-82 that generated the event is not the final unit in the pipeline (meaning EPP unit 26 has not finished processing the current packet or that processing has not been finished early as may occur upon trapping the packet; "NO" 128), the remaining ones of units 70-82 may continue to perform their aspects of egress packet processing, potentially generate events or not ("NO" 124) and execute microcode to process the events (126) until the final one of units 70-82 (i.e., unit 82 in this example) has finished processing the current packet ("YES" 128).

Once finished, egress sampling unit 80 may first determine whether any traps have been associated with the current packet (129). If one or more traps have been associated with the current packet, as denoted by the trap portion of the vector included within notification 56"'' ("YES" 129), egress sampling unit 80 may resolve these traps to determine a special action for handling the trapped packet (130). This special action may comprise dropping the packet or determining a special internal nexthop that is to perform the special handling of this packet (such as a service card). When two or more traps are associated with the current packet, egress sampling unit 80 may resolve these traps in a manner similar to resolving associated sampling classes as described above. That is, each trap may be assigned a priority which is expressed by its bit position within the trap portion of the bit vector included within notification 86'''. Egress sampling unit 80 may consider the highest priority associated trap and determine whether to, for example, drop the packet or determine a special internal nexthop for processing the packet. Configuration data 32 may specify whether, when handling this trap, all lower priority traps are to be cleared. Configuration data 32 may also specify for the other set traps an override to prevent higher priority traps from clearing this lower priority trap configured with an override. In any event, egress sampling unit 80 may mark this packet as special and associate the packet with the special action.

After resolving the traps, egress sampling unit 80 may map the traps associated with the current packet via the set bits of the trap portion of the bit vector included within notification 86''' that remain after resolving the traps to one or more sampling classes in the manner described above (131). Egress sampling unit 80 may then resolve the sampling classes associated with the current packet, as described above (132). That is, egress sampling unit 80 may sequentially assess each of the associated sampling class in order of decreasing priority, clearing any associated sampling classes of lower priority than the sampling class currently under assessment when admin 21 has configured this sampling class in this manner. Moreover, when attempting to clear these lower priority sampling classes, egress sampling unit 80 may encounter overrides with respect to other associated, but lower priority, sampling classes that override any attempts by a higher priority sampling class to clear its associated bit.

If one or more sampling classes are associated with the packet, then egress sampling unit 80 causes EPP unit 26 to make a copy or otherwise sample this current packet as well as potentially other subsequent packets associated with the same flow or session ("YES" 134). If no sampling classes are associated with the current packet, egress sampling unit 80 does not cause EPP unit 26 to make any copies of the packet ("NO" 134). Assuming at least one sampling class is associated with the current packet that requires a copy to be made ("YES" 134), egress sampling unit 80 may cause EPP unit 26 to copy the current packet and forward this copy of the current packet to a destination specified by configuration data 32, where this destination may include a log, a database, a service plane, a service card, a security card or any other destination to which sampled packets are commonly communicated or stored (136). Egress sampling unit 80 may cause EPP unit 26 to make multiple copies of the packet in some instances when multiple different sampling class bits in the bit vector remain set after resolving each associated sampling class.

After causing EPP unit 26 making any copies of the current packet in accordance with associated sampling classes, egress sampling unit 80 may then determine if the packet has been previously marked as special (138). If egress sampling unit 80 determines that this packet has not been previously marked as special ("NO" 138), egress sampling unit 80 forwards this current packet to the determined external nexthop (which in this instance is assumed to be another one of PFEs 16, such as PFE 16N; 140).

However, if either of result processing unit 52 of IPP unit 24 or egress processing unit 80 of EPP unit 24 determine that this packet has been previously marked as special ("YES" 116 and/or 138), IPP unit 24 and/or EPP unit 26 may, referring to FIG. 4C, determine whether the associated special action requires that the packet be dropped (141). If the associated special action indicates that the packet is to be dropped ("YES" 141), either IPP unit 24 or EPP unit 26, depending on which of these units marked the packet as special, drops the packet (142), and the packet processing continues in the manner described above with respect to the next received packet (96-145). If the associated special action indicates that the packet requires special handling rather than dropping the packet ("NO" 141), IPP unit 24 and/or EPP unit 26 forwards the packet to the determined special internal nexthop, which may direct the packet to a service plane, service card, routing engine or other internal destination within router 10 that is not normally associated with standard packet processing (143). This unit may receive this packet and then perform the special packet processing (144). The special packet processing unit may, upon finishing the special packet processing, forward the packet to the internal next hop determined by IPP unit 24 (145).

In instances where IPP unit 24 forwarded the packet to the special packet processing unit, the special packet processing unit may forward the packet to the determined internal nexthop. In instances where EPP unit 26 forwarded the packet to the special packet processing unit, EPP unit 26 may repeat egress packet processing (referring to FIG. 4B, 120-140) or may skip this egress packet processing and forward the packet to the determined internal next hop (referring to FIG. 4B, 140).

Figure 5A:
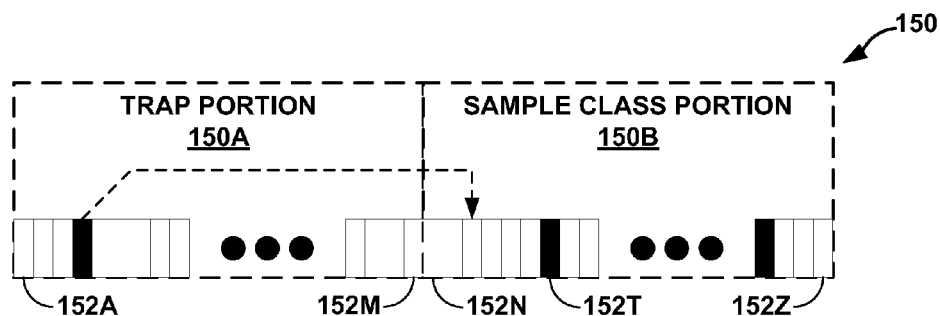
FIGS. 5A-5C are diagrams illustrating an example bit vector included within a notification when processed in accordance with the flexible packet processing techniques described in this disclosure.
Figure 5B:
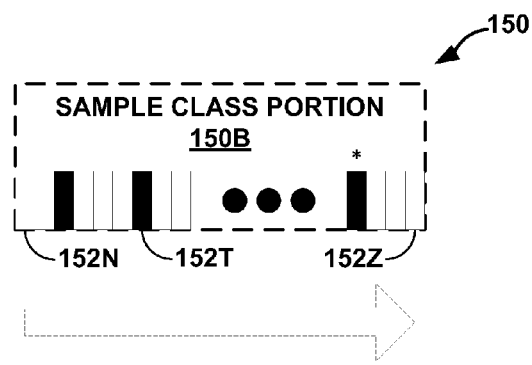
Figure 5C:
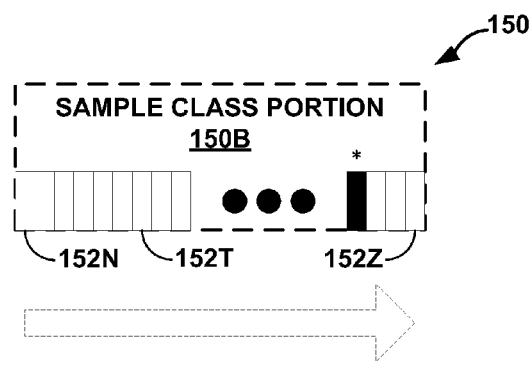

FIGS. 5A-5C are diagrams illustrating an example bit vector 150 included within a notification, such as notification 56 shown in the example of FIGS. 1 and 2, when processed in accordance with the flexible packet processing techniques described in this disclosure. In the example of FIG. 5A, bit vector 150 includes a first trap portion 150A and a second sampling class portion 150B. Trap portion 150A includes a number of bits 152A-152M for associating one or more traps with the current packet. Sampling class portion 150B also includes a number of bits 152N-152Z for associating one or more sampling classes with the current packet. Assuming traps are mapped to sampling classes, upon receiving this bit vector 150, result processing unit 52 may first process the traps in a manner described above, resolving the set traps in a manner similar to resolving the set sampling classes. In this example, there is only one trap, which does not require any resolution with respect to other traps. Assuming this trap is configured to be mapped to a sampling class, result processing unit 52 may map those traps associated with the set traps (which are denoted by black-filled boxes rather than white-filled boxes) to one or more of the sampling classes. Result processing unit 52 may map these bits in accordance with configuration data 32. An exemplary mapping is shown in the example of FIG. 5A with respect to the arrow from bit 152D to bit 152P.

In some instances, when processing these traps to map these traps to the sampling classes, result processing unit 52 may not map each and every set trap to one or more sampling classes. Instead, result processing unit 52 may process the corresponding trap and only drop the packet or otherwise forward the current packet to an internal destination specified by the trap handling routine of the microcode (which itself is configured in accordance with configuration data 32). In this manner, result processing unit 52 may resolve traps without mapping them to a sampling class (which generally involves making a copy of the current packet) and therefore sampling the current packet.

FIG. 5B shows the result of mapping set trap bit 152D to sampling class identified by bit 152P. Result processing unit 52 may then resolve those of bits 152N-152Z that are set with respect to one another. Result processing unit 52 may first consider the highest priority one of bits 152N-152Z that is set. It is assumed in this example that the highest priority one of bits 152N-152Z is the one farthest to the left of sample class portion 150B (i.e., bit 152N in this example). It is further assumed that the next highest priority sampling class is identified by bit 152O, and the third highest priority sampling class is identified by 152P and so on with the lowest priority sampling class being identified by bit 152Z. Consequently, under these assumptions, result processing unit 52 sequentially considers each of bits 152N-152Z from left to right (as indicated by the dashed-lined arrow). Result processing unit 52 may, in this example, first resolve set bit 152P with respect to every other one of bits 152Q-152Z identifying a sampling class having a lower priority than that identified by bit 152P.

Result processing unit 52 may first determine whether this user-configured sampling class requires that all other lower priority sampling classes be cleared. Assuming configuration data 32 indicated that for the sampling class associated with bit 152P requires all other lower priority sampling class bits to be cleared, result processing unit 52 attempts to clear the remaining ones of bits 152Q-152Z that are set (i.e., bits 152T and 152W in this example). The asterisk above bit 152W in the example of FIG. 5B denotes that the sampling class identified by this bit 152W provides an override to override any attempts by higher priority sampling classes from clearing bit 152W. Thus, when resolving bit 152P with respect to set bit 152T, result processing unit 52 clears bit 152T because it does not provide an override to override this attempt to clear bit 152T. However, when resolving bit 152P with respect to set bit 152W, result processing unit 52 does not clear this bit 152W because it provides this override to override the attempt to clear bit 152W. Result processing unit 52 may also determine whether to copy or drop the current packet based on the user-configured sampling class identified by set bit 152P. Result processing unit 52 may then clear bit 152P after resolving this bit with respect to the remaining ones of bits 152Q-152Z.

FIG. 5C shows the result of resolving set bit 152P. In the example of FIG. 5C, result processing unit 52 has cleared bit 152T without processing this event in accordance with the user-defined sampling class. Instead, result processing unit 52 determines only that bit 152W is set. Since no other bits are set that are of lower priority than bit 152W, result processing unit 152 does not need to resolve this bit with respect to any other bits, as there are not bit conflicts in this instance. Result processing unit 52 may then proceed to sampling the current packet and/or drop the current packet in accordance with the user-defined sampling class, clearing this bit 152W when finished sampling the current packet.

Various embodiments of the techniques have been described. These and other embodiments are within the scope of the following claims.

The invention claimed is:

1. A method for processing a data packet, the method comprising:
when processing the data packet with each of a plurality of pipelined packet processing units included within a packet processing circuit of a network device, generating one or more events with one or more of the plurality of pipelined packet processing units of the packet processing circuit, each of the plurality of pipelined packet processing units representing a different functional stage in a packet processing pipeline performed by the packet processing circuit;
determining, with the one or more of the plurality of pipelined packet processing units, whether to associate one or more of a trap and a sampling class with the data packet based on the generated events, wherein the trap indicates that the packet is to require special handling by a special handling unit external to the packet processing engine of the network device, and wherein the sampling class indicates that the packet is to be copied by the network device to form a duplicate packet;
setting, with the one or more of the plurality of pipelined packet processing units, one or more bits of a vector that is passed internally between each of the plurality of pipelined packet processing units of the packet processing circuit to associate the packet with the determined trap or sampling class in response to the events and to defer handling of the events at the different functional stares of the packet processing pipeline until each of the plurality of pipelined packet processing units have processed the packet to determine a nexthop to which to send the packet; and
after processing the packet with each of the plurality of packet processing units to determine the next hop to which to send the packet, processing the packet with the packet processing circuit in accordance with the set one or more bits of the vector to handle the one or more events generated by any one of the plurality of pipelined packet processing units.

2. The method of claim 1, further comprising:
presenting a user interface by which to receive configuration data that defines associations between each of the one or more events and each of the trap and the sampling class; and configuring software executed by the plurality of pipelined packet processing units to associate the one or more events to the trap or the sampling class in accordance with the associations defined by the configuration data, and
wherein determining whether to associate one or more of the trap and the sampling class comprises executing the software with the plurality of pipelined packet processing units to determine whether to associate one or more of the trap and the sampling class from the generated one or more events in accordance with the association defined by the configuration data.

3. The method of claim 1, wherein the trap comprises one of a plurality of traps, wherein the sampling class comprises one of a plurality of sampling classes, wherein determining whether to associate one or more of a trap and a sampling class with the data packet comprises determining, with a first one of the plurality of pipelined packet processing units, to associate a first set of one or more of the plurality of traps and the plurality of sampling classes with the data packet based on the generated one or more events, wherein setting one or more bits of the vector comprises setting, with the first one of the plurality of pipelined packet processing units, a first set of the one or more bits of the vector to associate the packet with the determined first set of one or more of the plurality of traps and the plurality of sampling classes, wherein determining whether to associate a trap and a sampling class with the data packet further comprises, after determining to associate the data packet with the first set of one or more of the plurality of traps and the plurality of sampling classes with the data packet with the first one of the plurality of pipelined packet processing units, determining, with a second one of the plurality of pipelined packet processing units, to associate a second set of one or more of the plurality of traps and the plurality of sampling classes with the data packet based on the generated one or more events, wherein the second one of the plurality of pipelined packet processing units is different from the first one of the plurality of pipelined packet processing units, and wherein setting one or more bits of the vector comprises setting, with the second one of the plurality of pipelined packet processing units, a second set of the one or more bits of the vector to associate the packet with the determined second set of one or more of the plurality of traps and the plurality of sampling classes.

4. The method of claim 3, wherein the vector includes at least two bits; wherein the vector comprises a first trap portion that includes one of the at least two bits of the vector and a second sampling class portion that includes those of the at least two bits of the vector that are not included within the first trap portion, and wherein processing the packet in accordance with the one or more bits of the vector comprises: resolving those of the bits of the first trap portion of the vector that were set with respect to one another; processing the packet in accordance with the bits of the first trap portion of the vector that remain after resolving those of the bits of the first trap portion of the vector that were set; resolving those of the bits of the second sampling class portion of the vector that were set with respect to one another; and copying the packet in accordance with the bits of the second sampling class portion of the vector that remain after resolving those of the bits of the second sampling class portion of the vector that were set.

5. The method of claim 4, wherein resolving those of the bits of the first trap portion of the vector that were set with respect to one another comprises: identifying one of the bits of the first trap portion of the vector that was set and assigned a highest priority with respect to remaining bits of the first trap portion that were set; determining whether to clear the remaining bits of the first trap portion of the vector that were set; and clearing the remaining bits of the first trap portion of the vector that were set based on the determination; and wherein processing the data packet in accordance with the bits of the first trap portion of the vector comprises determining one or more special actions to be performed with respect to the data packet based on those of the bits of the first trap portion that remain set after resolving the bits of the first trap portion of the vector that were set, wherein the one or more special actions include dropping the packet and determining a special internal next hop to which to send the packet.

6. The method of claim 5, wherein determining whether to clear remaining bits of the first trap portion of the vector that were set comprises:
receiving configuration data indicating whether to clear the remaining bits of the first trap portion of the vector that were set; and determining whether to clear the remaining bits of the second trap portion of the vector that were set based on the received configuration data indicating whether to clear the remaining bits of the first trap portion of the vector that were set.

7. The method of claim 4, further comprising: receiving configuration data indicating whether to override any attempt to clear the remaining bits of the first trap portion of the vector, wherein determining whether to clear remaining bits of the first trap portion of the vector that were set comprises determining whether to clear the remaining bits of the first trap portion of the vector that were set based on the received configuration data that indicates whether to override any attempt to clear the remaining bits of the first trap portion of the vector.

8. The method of claim 4, wherein resolving those of the bits of the second sampling class portion of the vector that were set with respect to one another comprises: identifying one of the bits of the second sampling class portion of the vector that was set and assigned a highest priority with respect to remaining bits of the second sampling class portion that were set; determining whether to clear the remaining bits of the second sampling class portion of the vector that were set; and clearing the remaining bits of the second sampling class portion of the vector that were set based on the determination; and wherein processing the data packet in accordance with the bits of the second sampling class portion of the vector comprises determining whether to copy the data packet based on those of the bits of the second sampling class portion that remain set after resolving the bits of the second sampling class portion of the vector that were set.

9. The method of claim 8, wherein determining whether to clear remaining bits of the second sampling class portion of the vector that were set comprises: receiving configuration data indicating whether to clear the remaining bits of the second sampling class portion of the vector that were set; and
determining whether to clear the remaining bits of the second sampling class portion of the vector that were set based on the received configuration data indicating whether to clear the remaining bits of the second sampling class portion of the vector that were set.

10. The method of claim 8, further comprising: receiving configuration data indicating whether to override any attempt to clear the remaining bits of the second sampling class portion of the vector, wherein determining whether to clear remaining bits of the second sampling class portion of the vector that were set comprises determining whether to clear the remaining bits of the second sampling class portion of the vector that were set based on the received configuration data that indicates whether to override any attempt to clear the remaining bits of the second sampling class portion of the vector.

11. The method of claim 4, further comprising, after resolving those of the bits of the first trap portion of the vector that were set with respect to one another, mapping at least one of the bits that remain after resolving the bits of the first trap portion of the vector that were set with respect to one another to at least one of the bits included within the sampling class portion of the vector so as to set one of the bits included within the sampling class portion of the vector.

12. The method of claim 1, wherein a router includes the packet processing circuit comprising the one or more of a plurality of pipelined packet processing units of the packet processing circuit, and wherein the packet processing circuit is implemented with a single dedicated hardware unit.

13. A network device for processing a data packet comprising: a packet processing circuit that includes a plurality of pipelined packet processing units, each of the plurality of pipelined packet processing units representing a different functional stage in a packet processing pipeline performed by the packet processing circuit; and a special handling unit external from the packet processing circuit, wherein each of the plurality of packet processing units process the packet, and wherein at least one of the plurality of packet processing units, when processing the data packet, generate one or more events,
wherein the at least one of the plurality of packet processing units determine whether to associate one or more of a trap and a sampling class with the data packet based on the generated one or more events, and set one or more bits of a vector that is passed internally between the plurality of pipelined packet processing units to associate the packet with the determined trap or sampling class and to defer handling of the events at the different functional stages of the packet processing pipeline until each of the plurality of pipelined packet processing units have processed the packet to determine a nexthop to which to send the packet, and wherein the packet processing circuit, after the plurality of packet processing units have processed the packet to determine the next hop to which to send the packet, process the packet in accordance with the set one or more bits of the vector to handle the one or more events generated by any one of the plurality of pipelined packet processing units, wherein the trap indicates that the packet is to require special handling by the special handling unit, and wherein the sampling class indicates that the packet is to be copied to form a duplicate packet.

14. The network device of claim 13, further comprising a control unit that presents a user interface by which to receive configuration data that defines associations between each of the one or more events and each of the trap and the sampling class, wherein plurality of pipelined packet processing units execute software that is configured to associate the one or more events to the trap or the sampling class in accordance with the associations defined by the configuration data, and wherein the plurality of pipelined packet processing units execute the software to determine whether to associate one or more of the trap and the sampling class from the generated one or more events in accordance with the association defined by the configuration data.

15. The network device of claim 13, wherein the trap comprises one of a plurality of traps, wherein the sampling class comprises one of a plurality of sampling classes, wherein a first one of the plurality of pipelined packet processing units determines to associate a first set of one or more of the plurality of traps and the plurality of sampling classes with the data packet based on the generated one or more events and sets a first set of the one or more bits of the vector to associate the packet with the determined first set of one or more of the plurality of traps and the plurality of sampling classes, and wherein a second one of the plurality of pipelined packet processing units, after the first one of the plurality of pipelined packet processing units determines to associate the data packet with the first set of one or more of the plurality of traps and the plurality of sampling classes with the data packet, determines to associate a second set of one or more of the plurality of traps and the plurality of sampling classes with the data packet based on the generated one or more events, wherein the second one of the plurality of pipelined packet processing units is different from the first one of the plurality of pipelined packet processing units and sets a second set of the one or more bits of the vector to associate the packet with the determined second set of one or more of the plurality of traps and the plurality of sampling classes.

16. The network device of claim 15, wherein the vector includes at least two bits; wherein the vector comprises a first trap portion that includes one of the at least two bits of the vector and a second sampling class portion that includes those of the at least two bits of the vector that are not included within the first trap portion, and wherein the plurality of pipelined packet processing units further resolves those of the bits of the first trap portion of the vector that were set with respect to one another, processes the packet in accordance with the bits of the first trap portion of the vector that remain after resolving those of the bits of the first trap portion of the vector that were set, resolves those of the bits of the second sampling class portion of the vector that were set with respect to one another and causes the packet processing circuit to copy the packet in accordance with the bits of the second sampling class portion of the vector that remain after resolving those of the bits of the second sampling class portion of the vector that were set.

17. The network device of claim 16, wherein the plurality of pipelined packet processing units further identify one of the bits of the first trap portion of the vector that was set and assigned a highest priority with respect to remaining bits of the first trap portion that were set, determine whether to clear the remaining bits of the first trap portion of the vector that were set, clear the remaining bits of the first trap portion of the vector that were set based on the determination and determine one or more special actions to be performed with respect to the data packet based on those of the bits of the first trap portion that remain set after resolving the bits of the first trap portion of the vector that were set, wherein the one or more special actions include dropping the packet and determining a special internal next hop to which to send the packet.

18. The network device of claim 17, wherein the plurality of pipelined packet processing units further receive configuration data indicating whether to clear the remaining bits of the first trap portion of the vector that were set and determine whether to clear the remaining bits of the second trap portion of the vector that were set based on the received configuration data indicating whether to clear the remaining bits of the first trap portion of the vector that were set.

19. The network device of claim 16, further comprising a control unit that presents a user interface with which to receive configuration data indicating whether to override any attempt to clear the remaining bits of the first trap portion of the vector, wherein the plurality of pipelined packet processing units further determine whether to clear the remaining bits of the first trap portion of the vector that were set based on the received configuration data that indicates whether to override any attempt to clear the remaining bits of the first trap portion of the vector.

20. The network device of claim 16, wherein the plurality of pipelined packet processing units further identify one of the bits of the second sampling class portion of the vector that was set and assigned a highest priority with respect to remaining bits of the second sampling class portion that were set, determine whether to clear the remaining bits of the second sampling class portion of the vector that were set, clear the remaining bits of the second sampling class portion of the vector that were set based on the determination and determining whether to copy the data packet based on those of the bits of the second sampling class portion that remain set after resolving the bits of the second sampling class portion of the vector that were set.

21. The network device of claim 20, wherein the plurality of pipeline packet processing units further receive configuration data indicating whether to clear the remaining bits of the second sampling class portion of the vector that were set and determine whether to clear the remaining bits of the second sampling class portion of the vector that were set based on the received configuration data indicating whether to clear the remaining bits of the second sampling class portion of the vector that were set.

22. The network device of claim 20, further comprising a control unit that presents a user interface to receive configuration data indicating whether to override any attempt to clear the remaining bits of the second sampling class portion of the vector, wherein the plurality of pipelined packet processing units further determine whether to clear the remaining bits of the second sampling class portion of the vector that were set based on the received configuration data that indicates whether to override any attempt to clear the remaining bits of the second sampling class portion of the vector.

23. The network device of claim 16, wherein the plurality of pipelined packet processing units further map, after resolving those of the bits of the first trap portion of the vector that were set with respect to one another, at least one of the bits that remain after resolving the bits of the first trap portion of the vector that were set with respect to one another to at least one of the bits included within the sampling class portion of the vector so as to set one of the bits included within the sampling class portion of the vector.

24. The network device of claim 13, wherein the network device comprises a router, and wherein the packet processing circuit is implemented with a single dedicated hardware unit.

25. The network device of claim 13, wherein the packet processing circuit comprises one of an ingress packet processing circuit that perform ingress packet processing to process the data packet so as to determine an internal next hop to which the data packet is to be forwarded and an egress packet processing circuit that performs egress packet processing to process the data packet so as to determine an external next hop to which the data packet is to be forwarded, wherein the internal next hop identifies a destination internal to the router, and wherein the external next hop identifies an interface card of the router that is to forward the data packet to another network device external from the router.

26. A non-transitory computer-readable medium comprising instructions that, when executed, cause one or more of a plurality of packet processing units of a packet processing circuit to:
  determine whether to associate one or more of a trap and a sampling class with the data packet based on one or more events generated by the one or more of the plurality of packet processing units when processing a data packet, wherein the trap indicates that the packet is to require special handling by a special handling unit external to the packet processing circuit of the network device, wherein the sampling class indicates that the packet is to be copied to form a duplicate packet, and wherein each of the plurality of pipelined packet processing units representing a different functional stage in a packet processing pipeline performed by the packet processing circuit;
  set one or more bits of a vector that is passed internally between each of the plurality of pipelined packet processing units of the packet processing circuit to associate the packet with the determined trap or sampling class in response to the events and to defer handling of the events at the different functional stages of the packet processing pipeline until each of the plurality of pipelined packet processing units have processed the packet to determine a next hop to which to send the packet; and after processing the packet with each of the plurality of packet processing units to determine the next hop to which to send the packet, process the packet with the packet processing circuit in accordance with the set one or more bits of the vector to handle the one or more events generated by any one of the plurality of pipelined packet processing units.

27. The non-transitory computer-readable medium of claim 26, further comprising instructions that, when executed, cause one or more of a plurality of packet processing units of a packet processing circuit to:
  present a user interface by which to receive configuration data that defines associations between each of the one or more events and each of the trap and the sampling class; configure software executed by the plurality of pipelined packet processing units to associate the one or more events to the trap or the sampling class in accordance with the associations defined by the configuration data; and
  execute the software with the plurality of pipelined packet processing units to determine whether to associate one or more of the trap and the sampling class from the generated one or more events in accordance with the association defined by the configuration data.

28. The non-transitory computer-readable medium of claim 26, wherein the trap comprises one of a plurality of traps, wherein the sampling class comprises one of a plurality of sampling classes, wherein the non-transitory computer readable medium further comprises instructions that, when executed, cause one or more of a plurality of packet processing units of a packet processing circuit to: determine, with a first one of the plurality of pipelined packet processing units, to associate a first set of one or more of the plurality of traps and the plurality of sampling classes with the data packet based on the generated one or more events;
  set, with the first one of the plurality of pipelined packet processing units, a first set of the one or more bits of the vector to associate the packet with the determined first set of one or more of the plurality of traps and the plurality of sampling classes;
  after determining to associate the data packet with the first set of one or more of the plurality of traps and the plurality of sampling classes with the data packet with the first one of the plurality of pipelined packet processing units, determine, with a second one of the plurality of pipelined packet processing units, to associate a second set of one or more of the plurality of traps and the plurality of sampling classes with the data packet based on the generated one or more events, wherein the second one of the plurality of pipelined packet processing units is different from the first one of the plurality of pipelined packet processing units; and set, with the second one of the plurality of pipelined packet processing units, a second set of the one or more bits of the vector to associate the packet with the determined second set of one or more of the plurality of traps and the plurality of sampling classes.

29. The non-transitory computer-readable medium of claim 28, wherein the vector includes at least two bits; wherein the vector comprises a first trap portion that includes one of the at least two bits of the vector and a second sampling class portion that includes those of the at least two bits of the vector that are not included within the first trap portion, and
  wherein the non-transitory computer readable medium further comprises instructions that, when executed, cause one or more of a plurality of packet processing units of a packet processing circuit to:
resolve those of the bits of the first trap portion of the vector that were set with respect to one another;
  process the packet in accordance with the bits of the first trap portion of the vector that remain after resolving those of the bits of the first trap portion of the vector that were set;
resolve those of the bits of the second sampling class portion of the vector that were set with respect to one another; and
copy the packet in accordance with the bits of the second sampling class portion of the vector that remain after resolving those of the bits of the second sampling class portion of the vector that were set.

30. The non-transitory computer-readable medium of claim 29, further comprising instructions that, when executed, cause one or more of a plurality of packet processing units of a packet processing circuit to:

identify one of the bits of the first trap portion of the vector that was set and assigned a highest priority with respect to remaining bits of the first trap portion that were set;

determine whether to clear the remaining bits of the first trap portion of the vector that were set;

clear the remaining bits of the first trap portion of the vector that were set based on the determination; and determine one or more special actions to be performed with respect to the data packet based on those of the bits of the first trap portion that remain set after resolving the bits of the first trap portion of the vector that were set, wherein the one or more special actions include dropping the packet and determining a special internal nexthop to which to send the packet.

31. The non-transitory computer-readable medium of claim 30, further comprising instructions that, when executed, cause one or more of a plurality of packet processing units of a packet processing circuit to:

receive configuration data indicating whether to clear the remaining bits of the first trap portion of the vector that were set; and determine whether to clear the remaining bits of the second trap portion of the vector that were set based on the received configuration data indicating whether to clear the remaining bits of the first trap portion of the vector that were set.

32. The non-transitory computer-readable medium of claim 29, further comprising instructions that, when executed, cause one or more of a plurality of packet processing units of a packet processing circuit to:

receive configuration data indicating whether to override any attempt to clear the remaining bits of the first trap portion of the vector; and determine whether to clear the remaining bits of the first trap portion of the vector that were set based on the received configuration data that indicates whether to override any attempt to clear the remaining bits of the first trap portion of the vector.

33. The non-transitory computer-readable medium of claim 29, further comprising instructions that, when executed, cause one or more of a plurality of packet processing units of a packet processing circuit to:

identify one of the bits of the second sampling class portion of the vector that was set and assigned a highest priority with respect to remaining bits of the second sampling class portion that were set; determine whether to clear the remaining bits of the second sampling class portion of the vector that were set; clear the remaining bits of the second sampling class portion of the vector that were set based on the determination; and determine whether to copy the data packet based on those of the bits of the second sampling class portion that remain set after resolving the bits of the second sampling class portion of the vector that were set.

34. The non-transitory computer-readable medium of claim 33, further comprising instructions that, when executed, cause one or more of a plurality of packet processing units of a packet processing circuit to:

receive configuration data indicating whether to clear the remaining bits of the second sampling class portion of the vector that were set; and determine whether to clear the remaining bits of the second sampling class portion of the vector that were set based on the received configuration data indicating whether to clear the remaining bits of the second sampling class portion of the vector that were set.

35. The non-transitory computer-readable medium of claim 33, further comprising instructions that, when executed, cause one or more of a plurality of packet processing units of a packet processing circuit to:

receive configuration data indicating whether to override any attempt to clear the remaining bits of the second sampling class portion of the vector; and determine whether to clear the remaining bits of the second sampling class portion of the vector that were set based on the received configuration data that indicates whether to override any attempt to clear the remaining bits of the second sampling class portion of the vector.

36. The non-transitory computer-readable medium of claim 29, further comprising instructions that, when executed, cause one or more of a plurality of packet processing units of a packet processing circuit to, after resolving those of the bits of the first trap portion of the vector that were set with respect to one another, map at least one of the bits that remain after resolving the bits of the first trap portion of the vector that were set with respect to one another to at least one of the bits included within the sampling class portion of the vector so as to set one of the bits included within the sampling class portion of the vector.

37. The non-transitory computer-readable medium of claim 26, wherein a router includes the packet processing circuit comprising the one or more of a plurality of pipelined packet processing units of the packet processing circuit, and wherein the packet processing circuit is implemented with a single dedicated hardware unit.

* * * * *